United States Patent Office 3,477,248
Patented Nov. 11, 1969

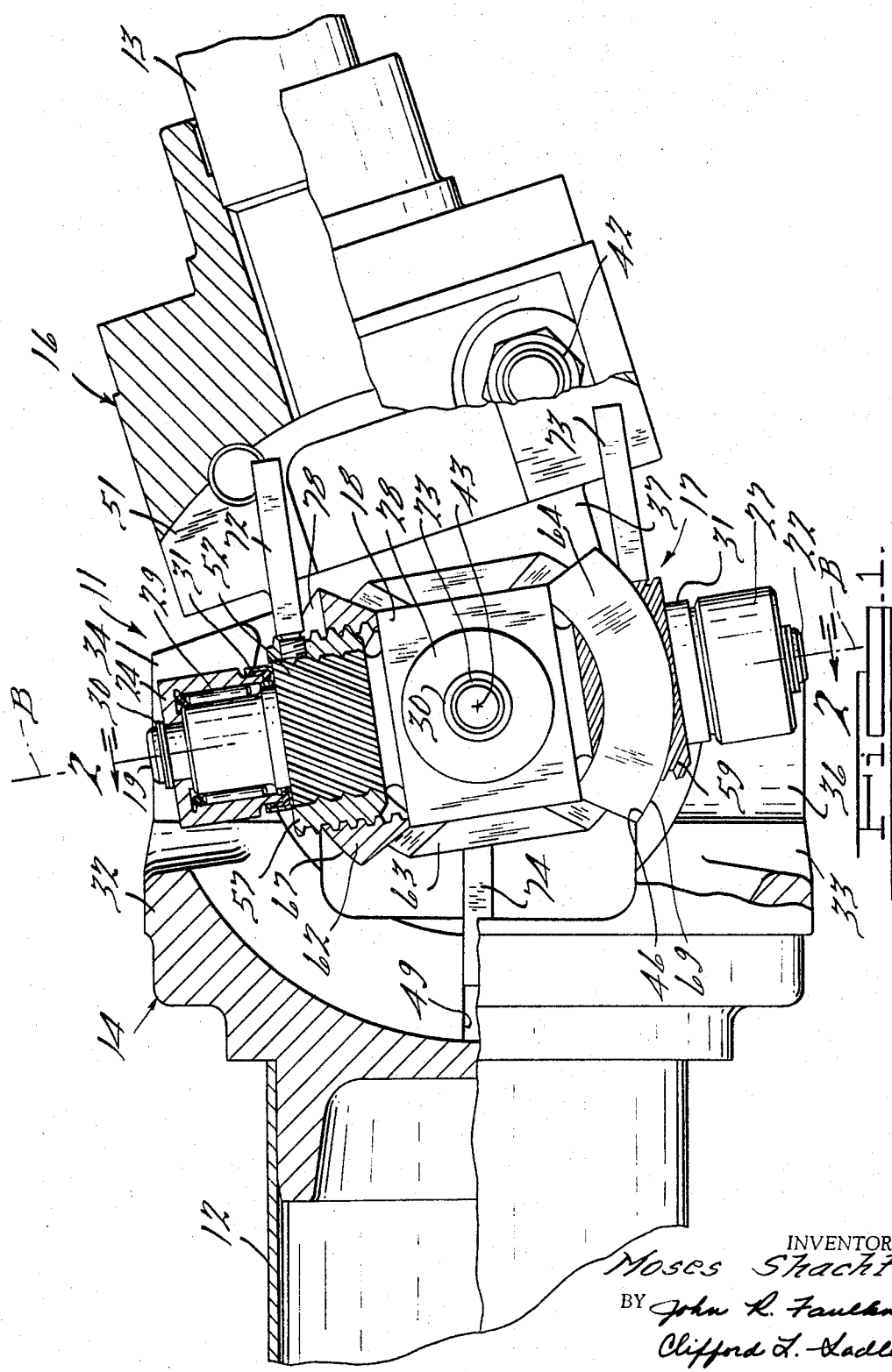

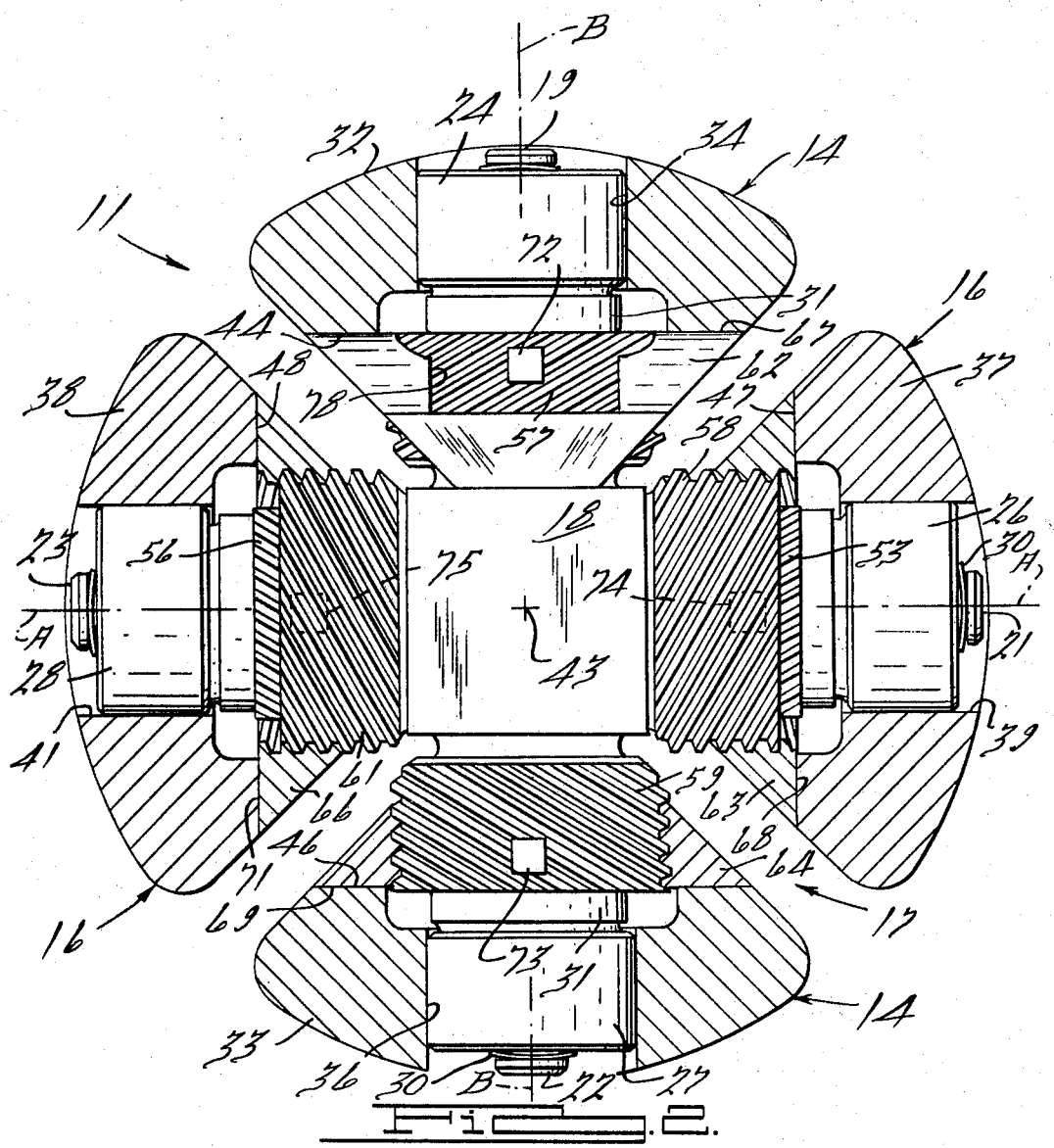

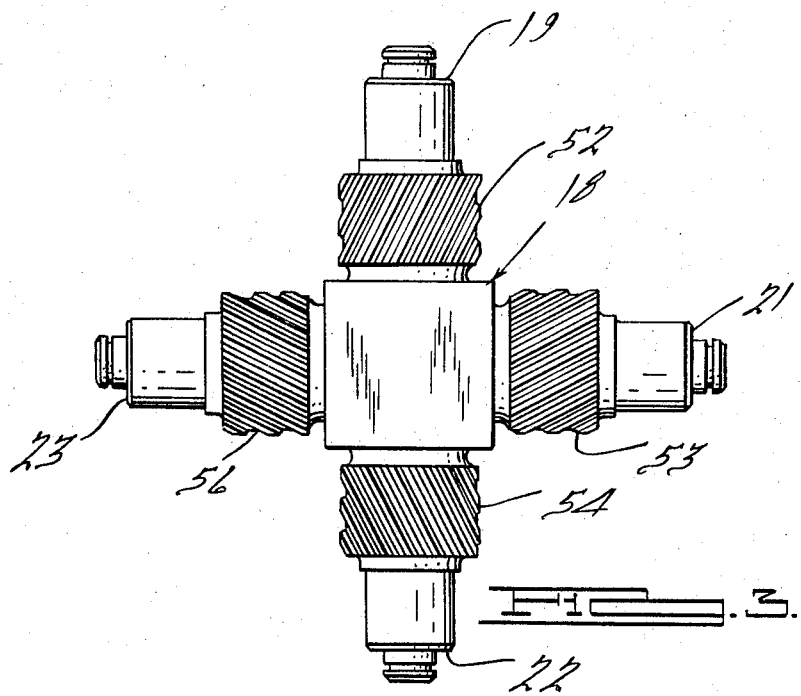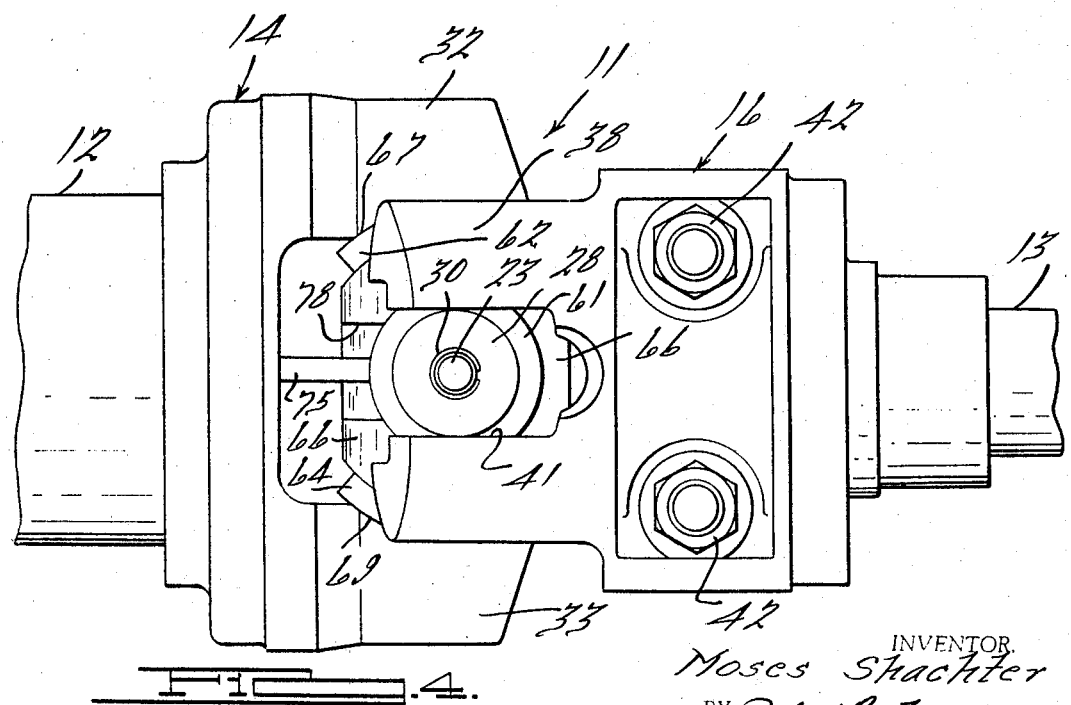

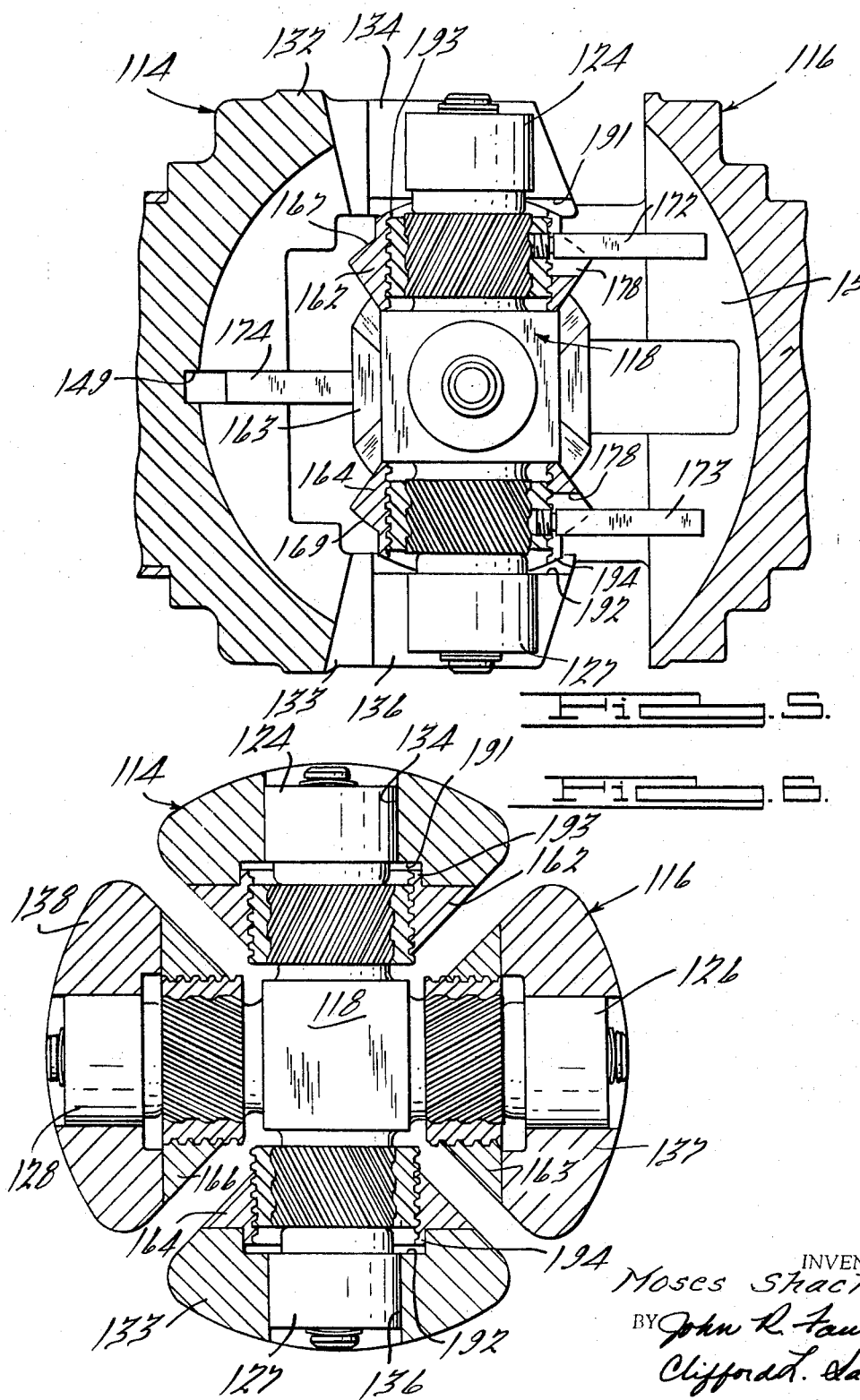

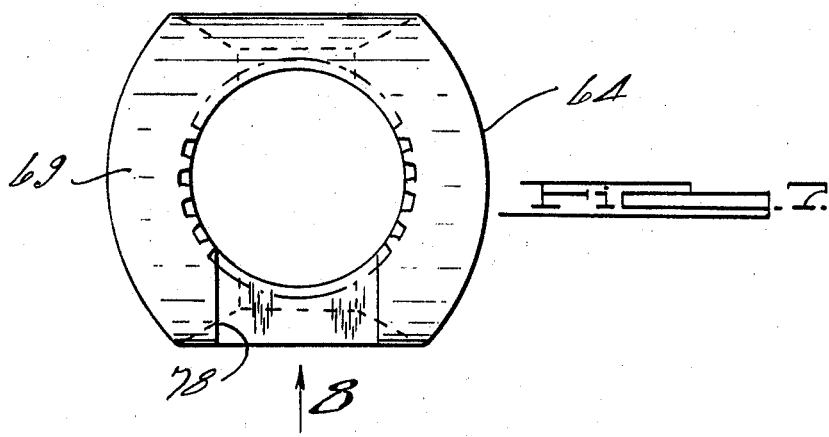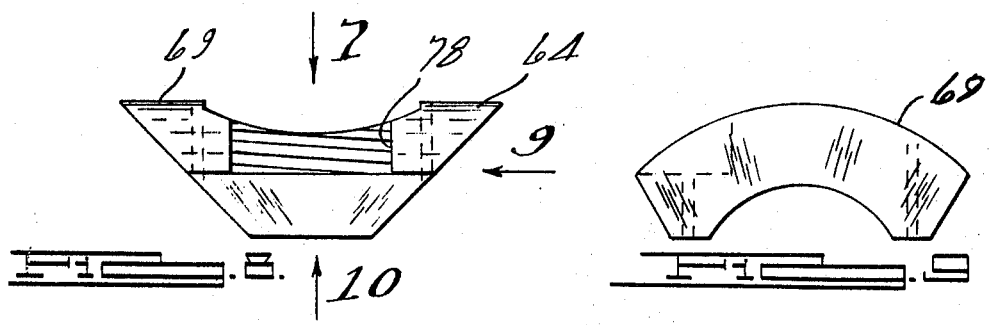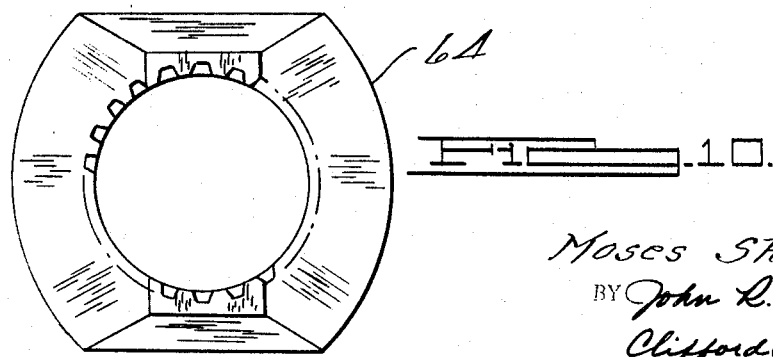

3,477,248
DIFFERENTIAL SCREW CONSTANT
VELOCITY JOINT
Moses Shachter, Oak Park, Mich., assignor to Ford
Motor Company, Dearborn, Mich., a corporation of
Delaware
Filed June 3, 1968, Ser. No. 733,876
Int. Cl. F16d 3/64, 3/34
U.S. Cl. 64—21                                    14 Claims

ABSTRACT OF THE DISCLOSURE

A constant velocity universal joint having a driving yoke, a driven yoke, and an intermediate cross member. The joint incorporates a differential screw assembly that functions to position the cross member in a plane which instantaneously bisects the angles formed by the intersection of the axes of rotation of the yoke members.

BACKGROUND OF THE INVENTION

Universal joints are used in applications where it is not possible to transmit a torque through a rigid shaft. A universal joint permits the transmission of a torque from a driving shaft to a driven shaft when the two shafts are at an angle to each other. A common universal joint is the Cardan joint which consists of a combination of a driving yoke, a cross member, and a driven yoke which connect two rotating shafts. A characteristic of the Cardan joint is that when the input shaft angular velocity is constant, the output shaft angular velocity varies sinusoidally an amount proportional to the angle between the input and the output shafts. This velocity variation is often tolerable in applications requiring only small shaft angles; however, the variation may become objectionable in applications requiring relatively large shaft angles.

When the velocity variations of a simple Cardan joint are objectionable, a more sophisticated joint, commonly called a constant velocity joint or a uniform motion joint, may be used which substantially eliminates the velocity variations. However, common disadvantages of constant velocity joints as compared with a simple Cardan joint are the relatively high cost of manufacture and the increased bulk.

This invention provides a construction for a universal joint which has a high load capacity, is of a simple design, is quiet in operation and substantially eliminates variations between input and output velocities.

It also provides a constant velocity joint which is both axially, as well as radially, compact.

Furthermore, the invention provides a constant velocity joint which is economical to manufacture, which does not require a large number of highly precisioned parts, and in which various plastic materials may be effectively utilized.

BRIEF SUMMARY OF THE INVENTION

A constant velocity universal joint constructed in accordance with this invention includes a first yoke, a second yoke and an intermediate cross member constructed to transmit a torque from one yoke to the other. The cross member includes a first pair of legs connected to the first yoke and a second pair of legs connected to the second yoke. A first threaded means is interposed between the first pair of legs and the first yoke; similarly, a second threaded means is interposed between the second pair of legs and the second yoke. A first connecting means is interposed between the first threaded means and the second yoke; a second connecting means is interposed between the second threaded means and the first yoke. The threaded means and the connecting means are constructed to move the cross member through an angle one-half the magnitude of the angular displacement of one yoke with respect to the other yoke when the one yoke is pivoted about an axis passing through one of the pairs of legs.

BRIEF DESCRIPTION OF THE DRAWINGS

FIGURE 1 is an elevational view with sections broken away of a universal joint embodying the invention.

FIGURE 2 is a view along lines 2—2 of FIGURE 1 illustrating certain parts in section and certain parts in elevation.

FIGURE 3 is an elevational view of the cross member 18.

FIGURE 4 is an elevational view similar to FIGURE 1, with no sections removed and in which the axes of rotation of the yokes are aligned.

FIGURE 5 is an elevational view with sections broken away of an alternate form of the invention.

FIGURE 6 is a view along lines 6—6 of FIGURE 5.

FIGURE 7 is a view of nut 64 along the direction of arrow 7 of FIGURE 8.

FIGURE 8 is a view of nut 64 in the direction of arrow 8 of FIGURE 7.

FIGURE 9 is a view of nut 64 in the direction of arrow 9 of FIGURE 8.

FIGURE 10 is a view of nut 64 in the direction of arrow 10 of FIGURE 8.

DETAILED DESCRIPTION OF A
PREFERRED EMBODIMENT

A constant velocity universal joint assembly is referred to generally in the drawings by numeral 11. The assembly 11 links two shafts 12 and 13 and comprises essentially two yokes 14 and 16 and an intermediate cross assembly 17.

The cross assembly 17 incluses a cross member 18 having four equal length and coplanar legs 19, 21, 22 and 23 intersecting at right angles. The common axis of legs 21 and 23 is designated as A—A in the drawings. Similarly, the common axis of legs 19 and 22 is designated as B—B. One of four identical rollers 24, 26, 27 and 28 is rotatably secured to each of the outer portions of the cross member legs. Needle bearings 29 may be used to reduce friction between the legs and the rollers. Spring clips 30 retain the rollers about the end portions of the legs. Dirt shields 31 are positioned about each of the rollers 24, 26, 27 and 28 adjacent their inner openings.

Yoke 14 has two arm portions 32 and 33 which extend toward the cross assembly 17. The arm portions have two axially extending slots 34 and 36 slidingly receiving axially opposed rollers 24 and 27, respectively. Similarly, yoke 16 has two arm portions 37 and 38 having two axially extending slots 39 and 41 which slidingly receive, respectively, rollers 26 and 28. A torque is transmitted from yoke 14 to yoke 16 via the rollers 24 and 27 received in slots 34 and 36, the cross member 18, and finally, the rollers 26 and 28 received in slots 39 and 41.

Each of yokes 14 and 16 has identical functional geometry; however, yoke 16 differs structurally from yoke 14, as illustrated in the drawings, in that yoke 16 has several elemental parts held together as a unit by cap screws 42, while yoke 14 is a one piece construction. The purpose of the multielement construction of yoke 16 is to ease final assembly of the joint 11. When assembled, yoke 14 is 90° axially out of phase with yoke 16.

A reference point 43 is defined as the intersection of the axis of rotation of shaft 12 and yoke 14 with the axis of rotation of shaft 13 and yoke 16. The axially inner surfaces 44 and 46 of the yoke arms 32 and 33, respectively, are cylindrical arcs having a common central axis passing through reference point 43. Similarly, the axially inner surfaces 47 and 48 of the yoke arms 37 and 38 are cylindrical arcs having a common central axis also passing through reference point 43. The axis of surfaces 44 and 46 is perpendicular to or 90 degrees out of phase with the axis of surfaces 47 and 48. It may be observed that when yokes 14 and 16 are aligned, the axis of cylindrical arc surfaces 44 and 46 is identical with axis B—B of the cross member legs 19 and 22, and the axis of cylindrical arc surfaces 47 and 48 is identical with axis A—A of the cross member legs 21 and 23.

A channel 49 is formed within yoke 14, located midway between the yoke arms 32 and 33 and extending in depth toward shaft 12. A similar channel 51 is formed within yoke 16, located midway between arms 37 and 38 and extending in depth toward shaft 13.

The radially inner portions of cross member legs 19, 21, 22 and 23 are formed with outer helical threads 52, 53, 54 and 56, respectively. Axially opposed threads are of opposite hand, i.e., threads 52 and 56 have a right-hand helix and threads 53 and 54 have a left-hand helix. Sleeve members 57, 58, 59 and 61 each have inner helical threads which engage threads 52, 53, 54 and 56, respectively, of the legs of cross member 18. In addition, sleeve members 57, 58, 59 and 61 have outer helical threads which engage corresponding inner threads of nuts 62, 63, 64 and 66, respectively. Both the inner and outer threads of sleeve members 57 and 61 are right-hand; sleeve members 58 and 59, left-hand. As may be seen in FIGURES 1 and 2 of the drawings, the helix angle of the sleeve inner threads and corresponding cross member leg threads is greateds is greater than the helix angle of the sleeve outer threads and corresponding nut threads. The exact relationship between the inner and outer helical threads of the sleeve to achieve constant velocity transmission is that the lead of the sleeve inner threads and cross member leg threads be twice the lead of the sleeve outer threads and nut threads.

The outer surfaces 67, 68, 69 and 71 are cylindrical arcs which mate with cylindrical arc surfaces 44, 47, 46 and 48, respectively, of yokes 14 and 16. These mating cylindrical surfaces permit relative angular movement of, e.g., yoke 14 and nuts 62 and 64 about the axis of surfaces 44 and 46, but preclude relative angular movement between yoke 14 and nuts 62 and 64 in all other planes. The relative angular movement between yoke 16 and nuts 63 and 66 about the axis of surfaces 47 and 48 is similar.

A functionally similar, but structurally distinct, connection is made between the sleeve members 57 and 59 and yoke 16 by means of connecting rods 72 and 73 and between sleeve members 58 and 61 and yoke 14 by means of connecting rods 74 and 75. Connecting rods 72 and 73 are threadedly secured to sleeve members 57 and 59, respectively, and extend into channel 51 of yoke 16. Similarly, connecting rods 74 and 75 are threadedly secured to sleeve members 58 and 61, respectively, and extend into channel 49 of yoke 14. The width of the channels 49 and 51 is approximately equal to the individual width of one of the connecting rods so that sliding movement between the yoke and the rods is permitted in the direction of the length of the channels, but is precluded in other directions. Thus, when yoke 16 pivots about the axis of surfaces 47 and 48, the connecting rods 72 and 73 and sleeve members 57 and 59 are constrained to move with yoke 16. On the other hand, when yoke 16 pivots in the direction of the length of channel 51, the connecting rods 72 and 73 and the sleeve members 57 and 59 are not constrained to move with yoke 16. The function of sleeve members 58 and 61, connecting rods 74 and 75, and channel 49 is similar.

Each of nuts 62, 63, 64 and 66 is formed with a recess 78 which provides clearance for one of connecting rods 72, 73, 74 and 75.

OPERATION

It is an established principle in the design of constant velocity joints that a necessary condition for transmittal of theoretically perfect constant angular velocity is that the plane of driving engagement between the two yokes must bisect the instantaneous angle between the two shafts. In a universal joint of the type having a pair of yokes and a cross member, this condition is closely approximated if the plane of the cross member bisects the obtuse angle between the shafts. It is therefore an object of this invention to provide a joint in which the plane of the cross member 18 at all times bisects the angle formed by the intersection of the axes of rotation of shafts 12 and 13.

Assuming that the shafts 12 and 13 and their adjoining yokes 14 and 16 are initially axially aligned and that the legs of the cross member 18 extend either vertically or horizontally, the response or movement of the cross assembly will be considered as yoke 16 is angularly displaced upwardly, in the plane of the paper, to a position as illustrated by FIGURE 1. It may be observed that angular displacement of yoke 16 within the plane of the paper of FIGURE 1 is the same as angular displacement about the common axis of cylindrical arc surfaces 44 and 46 which, under the defined conditions, is identical in position with the axis A—A of cross member legs 19 and 22. Consequently, for ease of identification, the following discussion of operation will refer to angular displacement about axis A—A of legs 19 and 22.

As yoke 16 is displaced upwardly to the position as shown in FIGURE 1 it may be seen that connecting rods 72 and 73 slide in channel 51 and transmit no motion about axis B—B to their adjoining sleeve members 57 and 59. Likewise, the cylindrical surfaces 67 and 69 of nuts 62 and 64 would slide along arc surfaces 47 and 48 of yoke 14 and transmit no rotational motion about axis B—B to nuts 62 and 64.

As the yoke 16 moves upwardly in FIGURE 1, it pivots about the common axis of surfaces 44 and 46, which under the defined conditions is identical to the axis A—A which passes through the center of legs 21 and 23 of the cross member 18 (see FIGURE 3). Axis A—A, under the defined conditions, is perpendicular to the plane of FIGURE 1 and passes through the point 43. Movement about axis A—A will produce no relative movement between the nut 62, sleeve 57 and leg 19 as well as none between nut 64, sleeve 59 and leg 22 (all of which are coaxial with axis B—B).

On the other hand, nuts 63 and 66 will turn with yoke 16 about axis A—A an amount equal to the angular displacement of the yoke due to the cooperating cylindrical surfaces between the nuts 63 and 66 and arms 37 and 38. The nuts 63 and 66 threadedly engage sleeves 58 and 61; however, these two sleeve members are prevented from turning with the nuts 63 and 66 by reason of the connecting rods 74 and 75 which extend into channel 49 of yoke 14. As a result, there is relative angular movement between the nuts 63 and 66 and the sleeves 58 and 61, and due to the threaded engagement between these parts, there is a corresponding axial displacement. As seen in FIGURE 2, sleeves 58 and 61 are moved inwardly toward the center 43 of the cross member 18. Axial movement of the sleeves 58 and 61 relative to the cross member 18 will impart a corresponding angular displacement to the cross member 18 as a consequence of the threaded engagement between the sleeves 58 and 61 and the cross member's threaded portions 53 and 56. Thus, angular displacement of the nuts 63 and 66 causes an axial displacement of the sleeves 58 and 61 which, in turn, causes an angular displacement of the cross member 58.

Because the leads of the helical threaded portions 53 and 56 of cross member 18 are twice those of the outside threads of the sleeves 58 and 61, the cross member 18 will have an angular displacement about the axis A—A an amount exactly equal to one-half of the angular displacement of the yoke 16 relative to the yoke 14. Motion of yoke 16 into and out of the plane of paper would cause a corresponding interaction between the remaining pairs of cross assembly elements. It may thus be seen that no matter what the angle between the shafts 12 and 13 may be, the plane of the cross member 18 always bisects the angle formed by the innersection of the axes of the shafts.

DETAILED DESCRIPTION OF AN ALTERNATE EMBODIMENT

An alternate embodiment of the invention is illustrated by FIGURES 5 and 6. This embodiment comprises a slip joint in which yoke 114 is free to move axially relative to cross assembly 178 and yoke 116. The previously described embodiment, illustrated by FIGURES 1-4, is a fixed joint in which displacement other than angular displacement between the yokes 14 and 16 is precluded.

Most parts of the two embodiments are identical; only the structural differences will be described in the following paragraphs. The corresponding elements of the two embodiments are correspondingly numbered; e.g., yoke 14 of the first embodiment is analogous to yoke 114 of the second embodiment.

Yoke 114 of the alternate embodiment has plane surfaces 144 and 146, rather than the cylindrical arc surface 44 and 46 of yoke 14. Parallel-edged grooves 191 and 192 are formed within each of the plane surfaces 144 and 146. The bases of the grooves 191 and 192 are also plane surfaces.

The nuts 162 and 164 are similar to nuts 62 and 64 except that they have protruding cylindrically arced back portions 193 and 194 which are received within grooves 191 and 192, respectively. The sides of the back portions 193 and 194 are parallel and slidingly engage the parallel edges of grooves 191 and 192. Relative angular movement between yoke 114 and nuts 162 and 164 is permitted only in the direction of grooves 191 and 192.

Except as noted above, the elements of the alternate embodiment are identical with those of the first embodiment.

The foregoing presents presently preferred embodiments of the invention. Modifications and alterations will occur to those skilled in the art that are included within the scope and spirit of the following claims.

What is claimed is:

1. A constant velocity universal joint comprising:
a first yoke and a second yoke,
a cross member intermediate said yokes constructed to transmit a torque from one yoke to the other,
said cross member including a first pair of legs connected to said first yoke and a second pair of legs connected to said second yoke,
first threaded means interposed between said first legs and said first yoke,
second threaded means interposed between said second pair of legs and said second yoke,
first connecting means interposed between said first threaded means and said second yoke,
second connecting means interposed between said second threaded means and said first yoke,
said means being constructed to move said cross member through an angle one-half the magnitude of the angular displacement of one yoke with respect to the other yoke when said one yoke is pivoted about an axis passing through one of said pairs of legs.

2. A constant velocity universal joint comprising:
a first yoke and a second yoke,
a cross assembly intermediate said yokes constructed to transmit a torque from one yoke to the other,
said cross assembly including four legs, one of said legs having a threaded portion,
a sleeve member threadedly engaging said threaded portion, said sleeve member having inner and outer threads,
a nut threadedly engaging the outer threads of said sleeve member,
a first pair of said legs being coaxial, a second pair of said legs being coaxial, said first pair of legs being perpendicular to and coplanar with said second pair of legs,
first connecting means between said nut and said first yoke and slidably engaging said first yoke,
second connecting means between said sleeve member and said second yoke and slidably engaging said first yoke,
said connecting means constructed to position the plane of driving contact of said cross assembly at an angle which bisects the axes of rotation of said yokes.

3. A constant velocity universal joint comprising:
a first yoke and a second yoke,
a cross assembly intermediate said yokes constructed to transmit a torque from one yoke to the other,
said cross assembly including four legs, at least two of said legs having threaded portions,
sleeve members threadedly engaging, respectively, each of said threaded portions, said sleeve members having inner and outer threads,
nuts threadedly engaging, respectively, the outer threads of each of said sleeve members,
a first pair of said legs, a first of said sleeve members and a first of said nuts having a first common axis,
a second pair of said legs, a second of said sleeve members and a second of said nuts having a second common axis that is perpendicular to and coplanar with said first axis,
said first nut slidingly engaging said first yoke and constructed to prevent angular displacement of said first nut relative to said first yoke about said first axis,
said second nut slidingly engaging said second yoke and constructed to prevent relative angular displacement of said second nut relative to said second yoke about said second axis,
first connecting means between said first sleeve member and said second yoke and slidingly engaging said second yoke when said second yoke is pivoted about said second axis, said first means being constructed to prevent angular displacement of said first sleeve member relative to said second yoke about said first axis,
second connecting means between said second sleeve member and said first yoke and slidingly engaging said first yoke when said first yoke is pivoted about said first axis, said second means being constructed to prevent angular displacement of said second sleeve member relative to said first yoke about said second axis.

4. A constant velocity universal joint according to claim 3 and including:
said first yoke engaging one coaxial pair of said legs,
said second yoke engaging the other coaxial pair of said legs.

5. A constant velocity universal joint comprising:
a first yoke and a second yoke,
a cross assembly intermediate said yokes constructed to transmit a torque from one yoke to the other,
said cross assembly having elements including
a cross member having four legs intersecting at right angles, each of said legs having a threaded portion,
sleeve members threadedly engaging, respectively, each threaded portion,
nuts threadedly engaging, respectively, the outer threads of said sleeve members,
said cross assembly having sliding contacts with said first and second yokes and functioning to position its cross member element in a plane that bisects the instantaneous angle formed by the intersection of the axes of rotation of said first and second yokes.

6. A constant velocity universal joint according to claim 5 and including:
a consecutive two of said threaded leg portions having right-hand threads, the threaded leg portions axially opposite said consecutive two of said threaded leg portions having left-hand threads.

7. A constant velocity universal joint according to claim 5 and including:
   the outer and inner threads of each of said sleeve members being helical and having the same hand of the helix, the lead of the outer threads being equal to one-half of the lead of the inner threads.

8. A constant velocity universal joint according to claim 5 and including:
   said yokes each having two arm portions, an axially disposed slot formed in each arm portion,
   said cross assembly including rollers rotatably mounted about each of the end portions of said legs, each of said rollers slidably received within each of said slots.

9. A constant velocity universal joint according to claim 5 and including:
   first connecting means between said pair of nuts and said first yoke and slidably engaging said first yoke,
   second connecting means between a second pair of nuts and said second yoke and slidably engaging said second yoke,
   third connecting means between a first pair of sleeve members and said second yoke and slidably engaging said second yoke,
   fourth connecting means between a second pair of sleeve members and said first yoke and slidably engaging said first yoke.

10. A constant velocity joint according to claim 9 and including:
    one of said connecting means comprising a pair of inwardly facing cylindrical arc surfaces of a common radius on one of said yoke members,
    a corresponding pair of outwardly facing cylindrical arc surfaces on said first pair of nuts of a common radius approximately equal to said first mentioned radius.

11. A constant volicity joint according to claim 9 and including:
    one of said connecting means comprising a channel extending axially into at least one of said yokes, and
    connecting rod means secured to and extending from a coaxial pair of said sleeve members into said channel, said connecting rod means having idividual width approximately equal to the width of said channel.

12. A constant volicity joint according to claim 9 and including:
    one of said connecting means comprising a pair of inwardly facing parallel plane surfaces on one of said yokes having a groove formed in each of said surfaces,
    a pair of outwardly facing cylindrical arc surfaces on said first pair of nuts having a common radius, a radially outwardly extending pair of back portions projecting from said arc surfaces, said back portions also having sylindrical arc surfaces of a common radius, the width of said back portions being approximately equal to the width of said grooves,
    said first mentioned arc surfaces engaging the parallel plane surfaces of said yoke, said arc surfaces of said back portion engaging the bottom of said grooves.

13. A constant velocity joint according to claim 9 and including:
    one of said connecting means comprising
       a pair of inwardly facing cylindrical arc surfaces having a common radius on one of said yoke members,
       a corresponding pair of outwardly facing cylindrical arc surfaces on said first pair of nuts having a common radius approximately equal to said first mentioned radius,
    another of said connecting means comprising
       a channel extending axially into at least one of said yokes, and
       connecting rod means secured to and extending from a coaxial pair of said sleeve members into said channel, said connecting rod means having individual width approximately equal to the width of said channel.

14. A constant velocity joint according to claim 9 and including:
    one of said connecting means comprising
       a channel extending axially into at least one of said yokes, and
       connecting rod means secured to and extending from a coaxial pair of said sleeve members into said channel, said connecting rod means having individual width approximately equal to the width of said channel,
    another of said connecting means comprising
       a pair of inwardly facing parallel plane surfaces on one of said yokes having a groove formed in each of said surfaces, and
       a pair of outwardly facing cylindrical arc surfaces on said first pair of nuts having a common radius, a radially outwardly extending pair of back portions projecting fom said arc surfaces, said back portions also having cylindrical arc surfaces of a common radius, the width of said back portions being approximately equal to the width of said grooves,
    said first mentioned arc surfaces engaging the parallel plane surfaces of said yoke, said arc surfaces of said back portion engaging the bottoms of said grooves.

References Cited
UNITED STATES PATENTS

| 1,626,270 | 4/1927 | Craun | 64—21 X |
| 3,036,446 | 5/1962 | Morgenstern | 64—21 X |

HALL C. COE, Primary Examiner

U.S. Cl. X.R.

64—17